United States Patent
Hansen

(10) Patent No.: US 6,754,733 B2
(45) Date of Patent: Jun. 22, 2004

(54) SHARED MEMORY ARCHITECTURE FOR INCREASED BANDWIDTH IN A PRINTER CONTROLLER

(75) Inventor: Eric R. Hansen, McKinney, TX (US)

(73) Assignee: Texas Instruments Incorporated, Dallas, TX (US)

(*) Notice: Subject to any disclaimer, the term of this patent is extended or adjusted under 35 U.S.C. 154(b) by 72 days.

(21) Appl. No.: 10/202,375

(22) Filed: Jul. 24, 2002

(65) Prior Publication Data

US 2003/0097495 A1 May 22, 2003

Related U.S. Application Data

(60) Provisional application No. 60/314,277, filed on Aug. 23, 2001.

(51) Int. Cl.[7] ................................................. G06F 3/00
(52) U.S. Cl. ............................. 710/22; 710/23; 710/27; 347/5
(58) Field of Search .............................. 710/22, 27, 23; 347/5

(56) References Cited

U.S. PATENT DOCUMENTS

| | | | | |
|---|---|---|---|---|
| 5,434,983 A | * | 7/1995 | Yaso et al. ............... | 710/110 |
| 5,619,726 A | * | 4/1997 | Seconi et al. ............ | 710/22 |
| 5,729,762 A | * | 3/1998 | Kardach et al. ......... | 710/22 |
| 6,219,759 B1 | * | 4/2001 | Kumakiri ................. | 711/137 |

FOREIGN PATENT DOCUMENTS

| | | | | | |
|---|---|---|---|---|---|
| JP | 56-153422 | * | 11/1981 | | |
| JP | 3-262063 | * | 11/1991 | | |
| JP | 3-270562 | * | 12/1991 | | |
| JP | 5-225114 | * | 9/1993 | | |
| JP | 6-175970 | * | 6/1994 | | |
| JP | 7-47720 | * | 2/1995 | .............. | B41J/5/30 |
| JP | 2000-155738 | * | 6/2000 | | |

\* cited by examiner

*Primary Examiner*—Fritz Fleming
(74) *Attorney, Agent, or Firm*—Robert D. Marshall, Jr.; W. James Brady, III; Frederick J. Telecky, Jr.

(57) ABSTRACT

A printer controller for processing print data includes a data processor, direct memory access controller, first and second memories with corresponding first and second transfer data busses. A bus switch selectively connects the first and second data transfer busses. When uncoupled, the data processor accessed the said first memory via the first data transfer bus and the direct memory access controller may independently accesses the second memory via the second data transfer bus. When connected, either the data processor or the direct memory access controller may access either memory to the exclusion of the other. This permits better allocation of data transfer bandwidth in the memory controller.

8 Claims, 6 Drawing Sheets

SHARED MEMORY ARCHITECTURE FOR INCREASED BANDWIDTH IN A PRINTER CONTROLLER

This application claims priority under 35 USC §119(e)(1) of Provisional Application No. 60/314,277, filed Aug. 23, 2001.

TECHNICAL FIELD OF THE INVENTION

The technical field of the invention is printer controllers.

BACKGROUND OF THE INVENTION

Printer controllers for computer systems have steadily grown in sophistication and performance. Digital signal processors are increasingly used to perform the wide variety of tasks required which include a high level of signal processing capability and multi-faceted interface requirements. Memory control is centralized in a memory interface controller function. These systems use increasingly large memory functions of several types, such as synchronous DRAM (SDRAM) and flash memory.

FIG. 1 illustrates the prior art steps required to process the input data that a printer typically receives from a conventional personal computer (PC). The output from the PC normally is supplied by a printer driver 101 that prepares an output print file. This file includes a set of instructions and data in a page description language (PDL) or compressed bitmap format. These instructions and data may be transported to the printer via IEEE 1284 (Firewire) or Universal Serial Bus (USB) cabling or over a local area network and stored in an input buffer memory 102.

The first computational step in the printer controller pipeline is interpretation 103 of the data. The display list from interpretation 103 includes a description of individual elements of graphics data or text data along with the position of these elements on the page. The display list may be in a banded or a non-banded format. In a banded format discrete bands are defined and formed as a part of the processing. After rendering, a number of these bands collectively form a full printer controller output page. In a non-banded format, each page is interpreted as a unit. After rendering, this unit forms an integral part of printer controller output.

The rendering pipeline stage 104 reduces the interpreted data of the display list to printer specific raster data. This process is sometimes called rasterization. The output of the rendering process is a bit map format in which discrete digitized dots (pixels) are generated to control the output device (e.g. ink jet pen, laser drum) with proportions of the colors cyan, yellow, magenta, and black. The rendering step is well suited to digital processing operations commonly used in digital signal processor devices. After rendering, the bit map data is stored in an output buffer memory stage 105. This bit map data is sent as needed to the printer output mechanism 106.

FIG. 2 illustrates a high-level view of the full complement of printer pipeline functions of the prior art. The input data has a variety of sources, such as spooled jobs on disc 201, parallel printer port 202, Universal Serial Bus (USB) port 203, Ethernet TCP/IP port 204 and IEEE 1284 (Firewire) 205. Each data source has its specific data format. This data must be reduced to a common format for processing in the pipeline. Streams interface unit 207 adjusts the format of the input data as required. For example, data arrives in parallel form from parallel printer port 202 and is converted in streams interface unit 207 as necessary for uniform processing in later stages. Likewise, streams interface unit 207 often carries out format adjustments upon data from USB port 203 in queue coming from the host processor.

Streams interface unit 207 sends data to the path that performs parallel interpretation of the composite postscript 208, printer control language PCL 210 or other PDL interpreter 210. Page pipeline block 209 re-assembles the results of the interpretation process into page format for page oriented processing before submitting page data to rendering unit 212. Postscript interpreter 208 or PCL interpreter 210 may send banded format data directly to rendering unit 212. Rendering unit 212 also performs compression, decompression or screening as required. PDL print controller to print engine controller interface unit 225 supplies data and control information to ASIC special purpose processor 213 to drive paper path control 216, the control panel/display 214 and the video data output 215.

FIG. 3 illustrates a conventional printer controller system. The system has typically a main processor 300 and a system ASIC printer controller 301, both served by a single processor bus 302. All major compute functions are carried out within the main processor 300.

The system interfacing to a personal computer (PC) 303 is directed by the system ASIC printer controller 301 via a USB port 304 or alternately by an IEEE 1284 (Firewire) compatible parallel port 305. ASIC printer controller 301 directs networking by the system via the Ethernet 306 from a local area network 307 and provides a mass storage interface via an ATA-4 compatible disc interface 308 to disc drive 309.

System data movement among main processor 300, system ASIC print controller 301, DRAM memory 310 and FLASH or ROM memory 311 are all accomplished via processor bus 302. System ASIC print controller 301 provides interface to printer engine via engine control signals 312 and video data output 313.

FIG. 4 illustrates the memory bandwidth requirement for the processor-initiated video output in the conventional system of FIG. 3. The processor-initiated video output is the most bandwidth intensive operation and must occur in real time. Three operations require processor bus 302 bandwidth: processor band clearing and write 406 of rasterized data to the output band buffer; the real-time read 407 of data from the printer engine; and real-time write 408 of data to the printer engine. This video output requires a total of 256 Mbytes/page for processor band clearing and write 406, 128 Mbytes/page for real-time read 407 and 128 Mbytes/page for real-time write 408 for a total of 512 Mbytes/page of processor bus 302 bandwidth. This translates into 136 Mbytes/sec for a 16 page/min printer.

FIG. 5 illustrates the data flow diagram for a conventional printer controller using a single processor bus. Three parts of the printer controller are identified with dashed-line boxes: DRAM 550, processor 551, and engine and peripheral interfaces 552. Operations and operation end points given in boxes in FIG. 5 require in many cases that the main processor yield the main processor bus to non-compute operations thereby slowing down overall processing speed. Each transfer of data is represented by a line and is labeled with the transfer size in Mbytes/page. Note that all transfer size requirements in FIG. 5 involve use of bus bandwidth on the common processor bus 302 in FIG. 3. Table 1 gives a complete list of the bus bandwidth requirements for each major controller operation. Specific operations in FIG. 5 may be cross-referenced to the list given following Table 1, which also shows the bus bandwidth requirements for each major controller operation.

TABLE 1

| Number | Operation | Processor Bus Mbytes/page |
|---|---|---|
| 1 | Networking | 120 |
| 2 | Spooling | 80 |
| 3 | Stream I/F | 80 |
| 4 | Image Filter | 80 |
| 5 | Color Conversion | 47 |
| 6 | Text Interpretation (Font Decompression) | 4 |
| 7 | Graphics Interpretation (Display List) | 64 |
| 8 | Band Clearing | 128 |
| 9 | Rendering and Compression | 43 |
| 10 | Compressed Output Data | 11 |
| 11 | Decompress and Screen | 139 |
| 12 | Video Output Data | 256 |
| | Total | 1052 |

These data paths are detailed below. Note: DMA is direct memory access; PCI

1. Networking: Processor Bus 120 Mbytes/page
   From PDL input 500 to DMA 531 to PCI buffer 501 to DMA 521 to mbuffer 502 to DMA 522 to socket buffer 503.
2. Spooling: Processor Bus 80 Mbytes/page
   From socket buffer 503 to DMA 523 to temporary buffer 504 to DMA 524 to DOS buffer 505 to DMA 532 to disc write DMA 506.
3. Stream I/F: Processor Bus 80 Mbytes/page
   From disk read DMA 507 to DMA 533 to DOS buffer 508 to DMA 525 to stream buffer 510.
4. Image Filter: Processor Bus 80 Mbytes/page
   From stream buffer 510 to DMA 526 to temporary buffer 511 to filter 512 to image buffer 513.
5. Color Conversion: Processor Bus 47 Mbytes/page
   From image buffer 513 to color conversion 515 to converted image buffer 516.
6. Text Interpretation: Processor Bus 4 Mbytes/page
   From font decompression 545 to font buffer 543.
7. Graphics Interpretation: Processor Bus 64 Mbytes/page
   From display list generation 540 to display list buffer 544.
8. Band Clearing: Processor Bus 128 Mbytes/page
   From band clearing operation 541 to output band buffer 530.
9. Rendering and Compression: Processor Bus 43 Mbytes/page
   From render and compress operation 538 to compressed buffer 542.
10. Compressed Output Data: Processor Bus 11 Mbytes/page
    From compressed buffer 542 to uncompress and screen operation 539.
11. Decompress and Screen: Processor Bus 139 Mbytes/page
    From uncompress and screen operation 539 to output band buffer 530.
12. Video Output Data: Processor Bus 256 Mbytes/page
    From output band buffer 530 to DMA 534 to video output 535.

SUMMARY OF THE INVENTION

This invention comprises a shared-memory printer controller architecture with a dedicated direct memory access (DMA) controller allowing engine data to be transferred while the processor maintains its ability to access instructions and data.

In earlier systems, during the real-time transfer of data from memory to the printer engine, the processor is unable to access the processor bus. By partitioning the memory into shared and local, it becomes possible to avoid such processor bottlenecks.

BRIEF DESCRIPTION OF THE DRAWINGS

These and other aspects of this invention are illustrated in the drawings, in which.

DETAILED DESCRIPTION OF THE INVENTION

Figure 6:
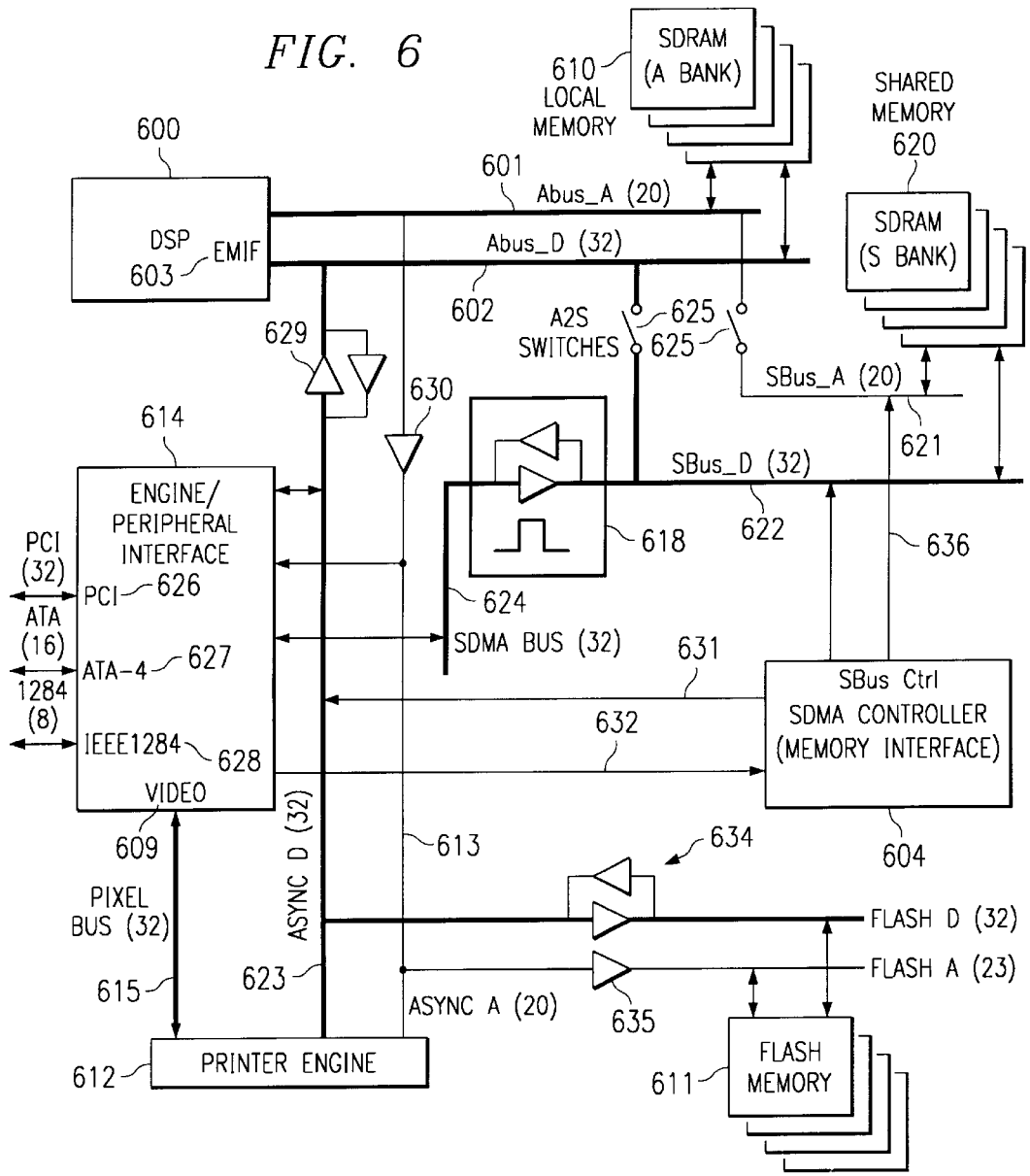
FIG. 6 illustrates the shared memory printer controller system of this invention providing intensive image processing and efficient interfaces to peripheral input interface, video interface, memory control and engine control.

FIG. 6 illustrates the shared memory printer controller system of this invention. The system is a digital signal processor (DSP) centric printer controller, with all functions surrounding the Digital signal processor driven by controllers subject to the Digital signal processor. Also all major compute functions are carried out within the Digital signal processor. Digital signal processor 600 is preferably an efficient general-purpose device now becoming widely used for such applications. Digital signal processor 600 could be a TMS320C6211 manufactured by Texas Instruments. Digital signal processor 600 includes external memory interface (EMIF) 603 which interfaces with A Bank local memory 610 via address bus ABus_A 601 and data bus ABus_D 602. Digital signal processor 600 interfaces with S Bank shared memory 620 by closing the A2S switches 625 and passing addresses via bus SBus_A 621 and data via SBus_D 622. Isolation and buffering is obtained between the various busses of the system as required using the bus transfer bi-directional buffers 629 and 634, uni-directional buffers 630 and 635, and bi-directional synchronous buffer 618. Digital system processor 600 starts up upon initial application of electric power via initialization routines stored in FLASH memory 611. External memory port 603 of digital signal processor 600 specifies address within FLASH memory 611 via ABus_A 601, uni-directional buffer 630 and ABus_A extension 613. FLASH memory 611 data is accessed via ABus_D 602, bi-directional buffers 629 and ABus_D extension 623.

The system direct memory access controller (SDMA) 604 is basically a memory interface and control unit. System direct memory access controller 604 generates address signals 636 for system direct memory access to S Bank shared memory 620 and to A Bank local memory 610 via bus switches 625. Engine/peripheral interface unit 614 manages all communication with peripheral port connections. Engine/peripheral unit 614 transfers data via PCI port 626, supports disk reads and writes via ATA-4 port 627 and transfers data via IEEE 1284 port 628. Engine/peripheral unit 614 couples to ABus_A 601 via ABus_A extension 613 and uni-directional buffer 630 and couples to ABus_D 601 via ABus_D extension 623 and bi-directional buffers 629. Engine/peripheral unit 614 couples to SBus_D 622 via SBus_D extension 624 and bi-directional buffers 618. Video output port 609 of engine/peripheral unit 614 supplies pixel data to printer engine 612 via pixel bus 615.

The printer controller functions are efficiently partitioned as shown in FIG. 6 to improve performance, optimizing printer speed and versatility. Memory system partitioning is particularly important. Memory operations which would otherwise cause holds or slow down digital signal processing operations have been optimized through the separation of A Bank local memory 610 from S Bank shared memory 620 minimizing impact on digital signal processing.

FIG. 6 illustrates that digital signal processor 600 accesses A Bank local memory 610 directly through its local busses ABus_A 601 and ABus_D 602. The system direct memory access controller 604 accesses S Bank shared memory 620 directly through the shared busses SBus_A 621 and SBus_D 622. A2S switches 625 allow for communication between ABus 601/602 and SBus 621/622.

Digital signal processor 600 may access S Bank shared memory 620 when ABus 601/602 is tied to SBus 621/622 through the A2S switch 625. Because SBus 621/622 can be driven by digital signal processor 600, system direct memory access controller 604 must be placed in a hold state for this to occur. Thus system direct memory access controller 604 is prevented from accessing memory while digital signal processor 600 is accessing S Bank shared memory 620.

Similarly system direct memory access controller 604 may access the A Bank local memory 610 when the SBus is tied to the ABus through the A2S switch 625. This requires that digital signal processor 600 be placed in a hold state and prevented from any memory accesses while system direct memory access controller 604 accesses A Bank local memory 610.

When the A2S switch 625 is open, the ABus and SBus are isolated. This allows digital signal processor 600 and system direct memory access controller 604 separate accesses to the A Bank local memory 610 and S Bank shared memory 620, respectively.

I/O Buffers, Video Buffers and Bulk Data

Because they are accessed under explicit software control (i.e. using direct memory accesses or data handling routines), digital signal processor 600 may use I/O buffers and bulk data located in either bank. Digital signal processor 600 can always acquire the SBus upon entering a task to handle the buffer or before submitting a direct memory access request, and then release the bus once the access is complete.

In the same way, system direct memory access controller 604 only transfers data as a part of a direct memory access and always acquires and releases the ABus through hardware handshake with the arbiter. Therefore, system direct memory access controller 604 can access I/O and video buffers in either bank.

However, in order to provide for the highest possible performance, it is important to make maximum usage of the bus bandwidth available within the system. There are several factors to consider:

1. Whenever system direct memory access controller 604 or digital signal processor 600 accesses through the crosspoint A2S switch 625, it ties up both busses. This effectively doubles the bandwidth impact of the access on the system because it imposes the bandwidth requirement on both busses. Buffers should therefore be located in the memory to which the accessing controller connects directly.

2. Digital signal processor 600 typically uses program and data caches. It is not possible to reliably estimate when digital signal processor will access external memory when caches are used. Accesses to S bank shared memory 620 requires software control to switch bus switch 625 and hold bus accesses by system direct memory access controller 604. This can only take place after access to S bank shared memory 610 has been requested and granted following arbitration. Additional delays following external memory access for program branches and data accesses would result from storing this data in S bank shared memory 620. Thus it is advantageous to store program instructions and working variable data in A Bank local memory 610.

3. Because I/O operations require some usage of the crosspoint A2S switch 625, it is important to minimize the impact of I/O operations on the A Bus. Because the ABus must handle all instructions and cached data, it has a higher initial bandwidth loading. When extra bandwidth is used due to a crosspoint switch access, that additional bandwidth should come from the SBus if possible. Thus maximum performance can be achieved by making S Bank shared memory 620 the source or destination of all system direct memory accesses performed by system direct memory access controller 604, such as I/O and video transfers.

3. There are three different mechanisms for transferring data with PCI devices. Channel transfers use a pool of memory first-in-first-out buffers like other I/O transfers. These data transfers are best handled by system direct memory access controller 604 and stored in S Bank shared memory 620. Flexi-target data transfers are similar except these data transfers use first-in-first-out buffers in the PCI controller. These data transfers are also best handled by system direct memory access controller 604 and stored in S Bank shared memory 620. Shared memory PCI data transfers are intended for small random data transfers to a dedicated processor memory block. These transfers are initiated by hardware when the PCI device requests a read or write, engine and peripheral interface 614 signals digital signal processor 600 via external memory interface port 603. Since this is a hardware mechanism, it is not possible for software to request control of the SBus by holding system direct memory access controller 604 and be granted control following arbitration. Thus the buffer for PCI shared memory transfers should be in A Bank local memory 610.

EXAMPLE

Processor Initiated Video Output

Figure 1:
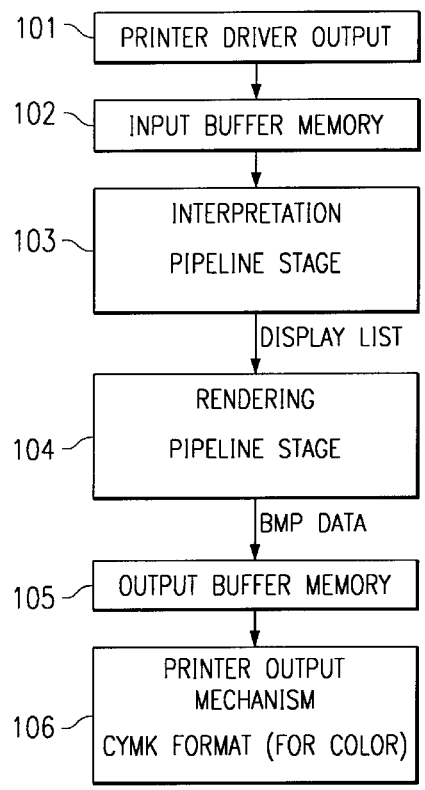
FIG. 1 illustrates a prior art printer controller pipeline requirement.
Figure 3:
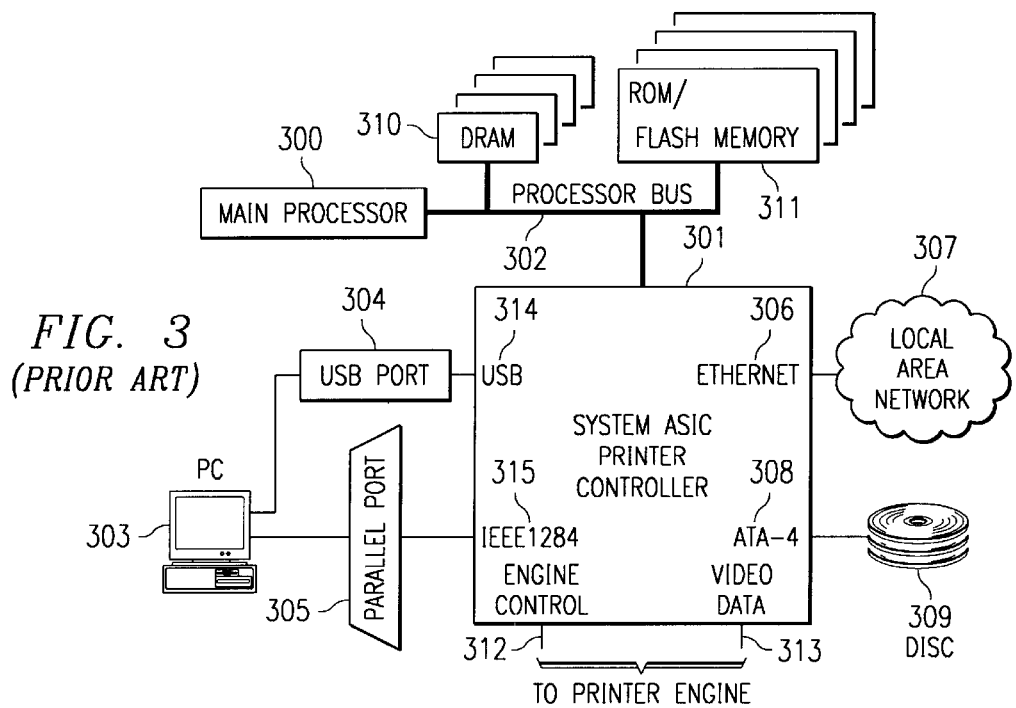
FIG. 3 illustrates a prior art single memory printer controller.
Figure 2:
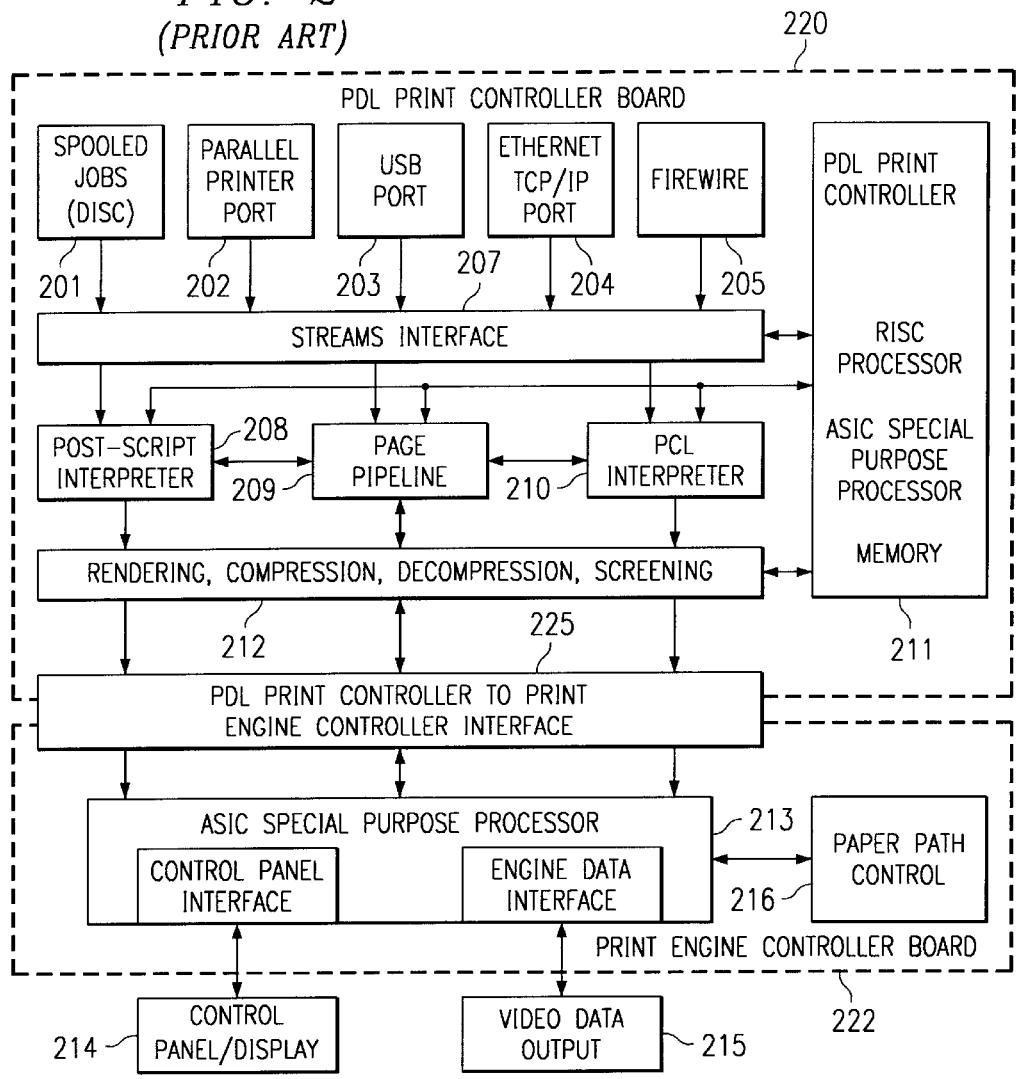
FIG. 2 illustrates a prior art printer system with a page description language (PDL) printer controller board interfaced with a separate engine controller board.
Figure 4:
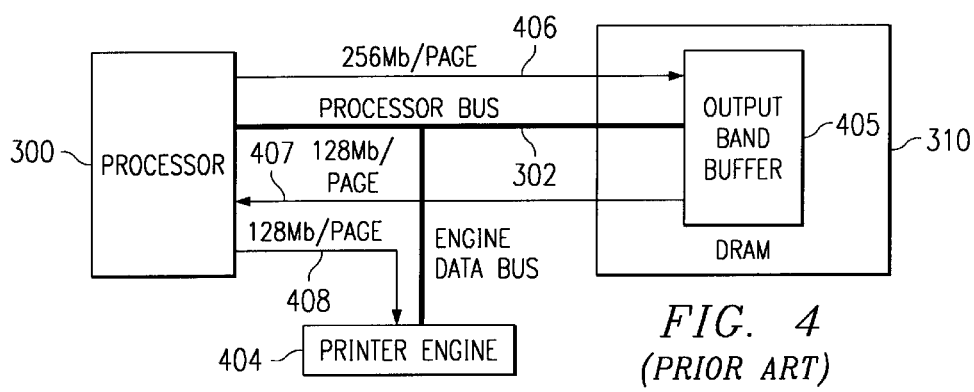
FIG. 4 illustrates the memory bandwidth requirement for a video output operation in the prior art printer controller system of FIG. 3.
Figure 5:
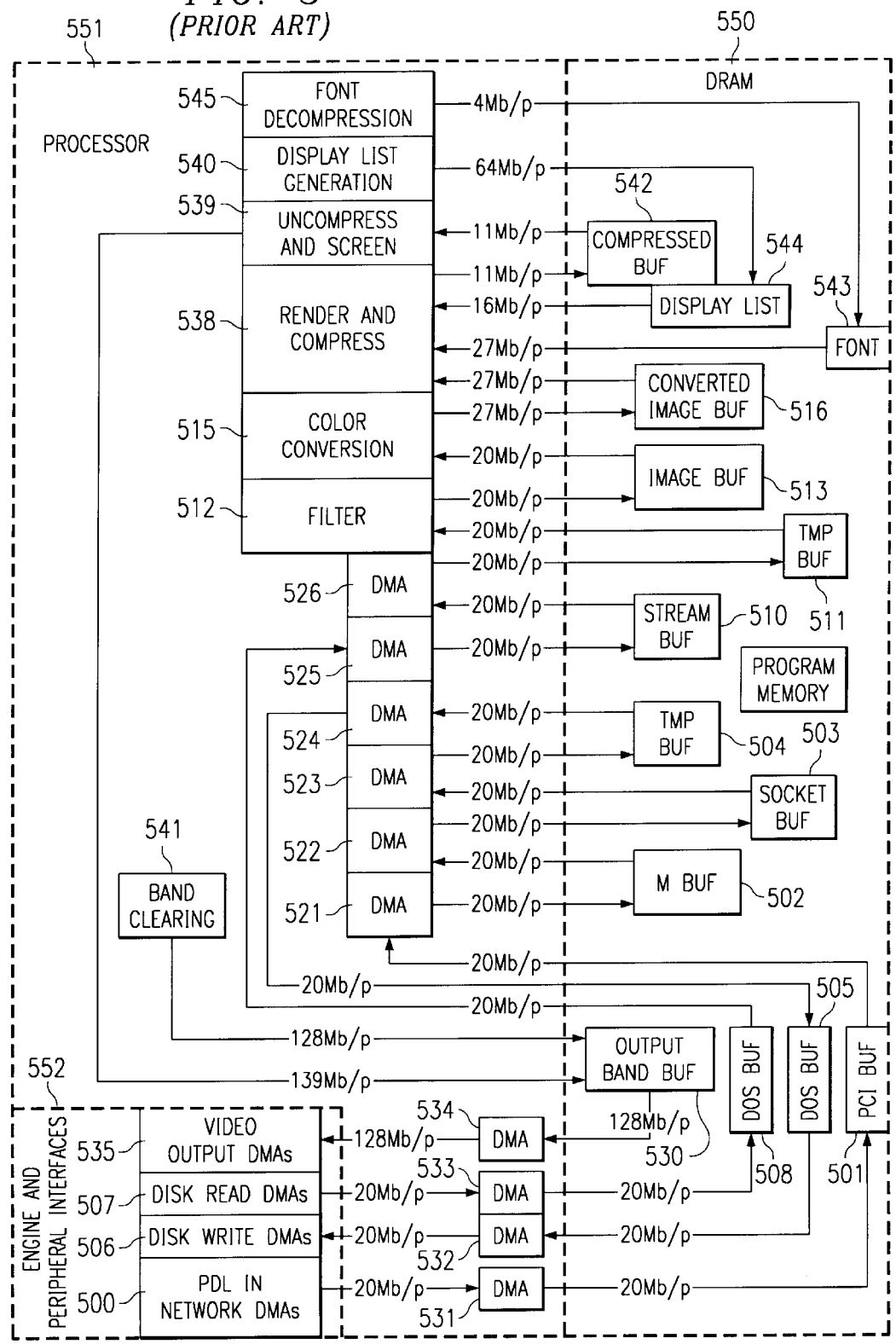
FIG. 5 illustrates the data flow diagram for a prior art printer controller system with a single centralized memory.
Figure 7:
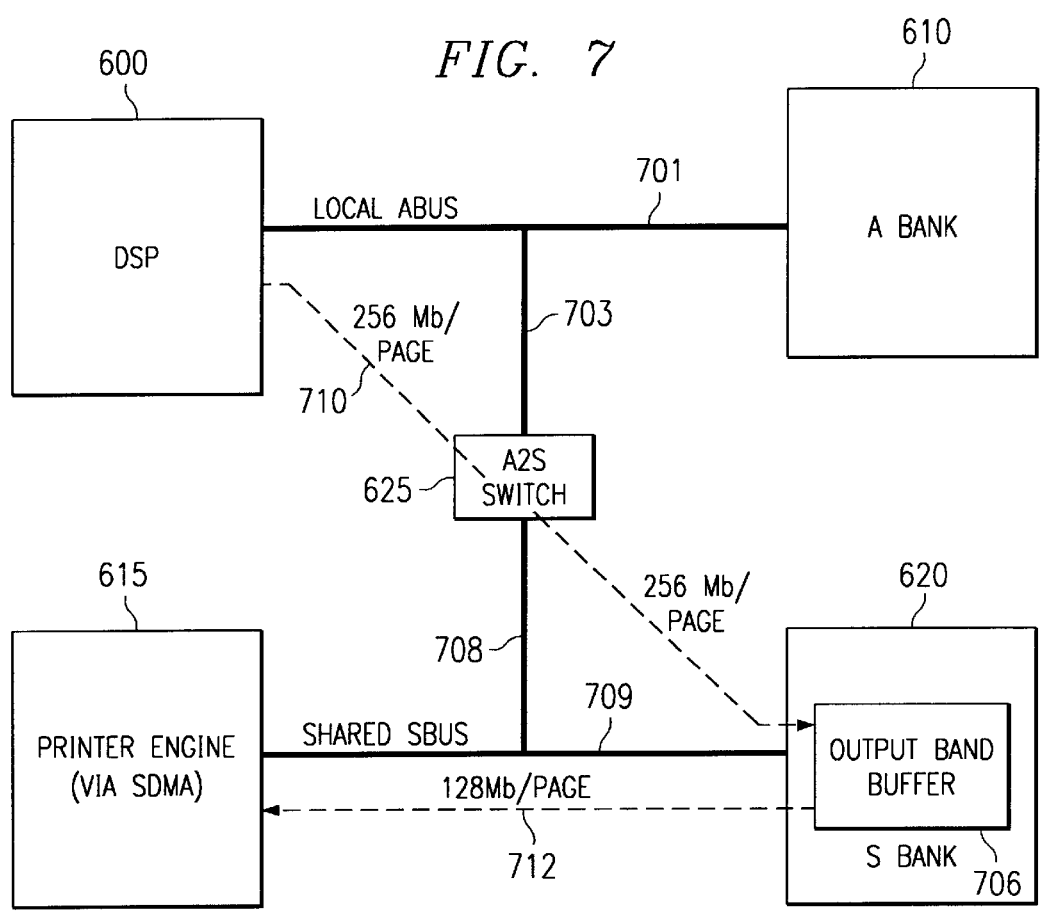
FIG. 7 illustrates the memory bandwidth requirement for a video output operation in the printer controller system of FIG. 6.

FIG. 7 illustrates the memory bandwidth requirement for a processor-initiated video output in the system of this invention, the printer controller in FIG. 6. The processor-initiated video output is the most bandwidth intensive operation and must occur in real time. Two operations requiring memory bus bandwidth are necessary. First digital signal processor 600 performs band clearing and writes video output 710 into output band buffer 706 of S Bank shared memory 620. This requires 256 Mbytes/page of ABus bandwidth and 256 Mbytes/page of SBus bandwidth. Secondly, the real time transfer of video data 712 from the output band buffer 706 in S Bank shared memory 620 to printer engine 615 via system direct memory access controller 640 requires 128 Mbytes/page of SBus bandwidth. Video output in the system of this invention requires a total of only 256 Mbytes/page of ABus (processor bus) 701 bandwidth and an additional 384 Mbytes/page of SBus (shared bus) 709 bandwidth. In a 16 page/min printer this equates to 68 Mbytes/s and 102 Mbytes/s on the ABus and SBus respectively. This compares with 136 Mbytes/s of processor bus bandwidth in the example of the conventional system in FIG. 4. The ABus 701 bandwidth is reduced to $68/136$ or one half of that required in the conventional system.

Performance Analysis

The performance of the system of this invention can be evaluated using the data from previous bandwidth analysis calculations. This analysis assumes the following parameters set forth in Table 2.

TABLE 2

| | |
|---|---|
| Input Image Size | 20 Mbytes |
| Output Contone Image Size | 128 Mbytes |
| Output Screened Image Size | 128 Mbytes |
| Final Display List Size | 16 Mbytes |
| Page Resolution | 600 DPI |
| Number of Output Planes | 4 |
| Output Resolution | 8 bits/pixel/plane |

Figure 8:
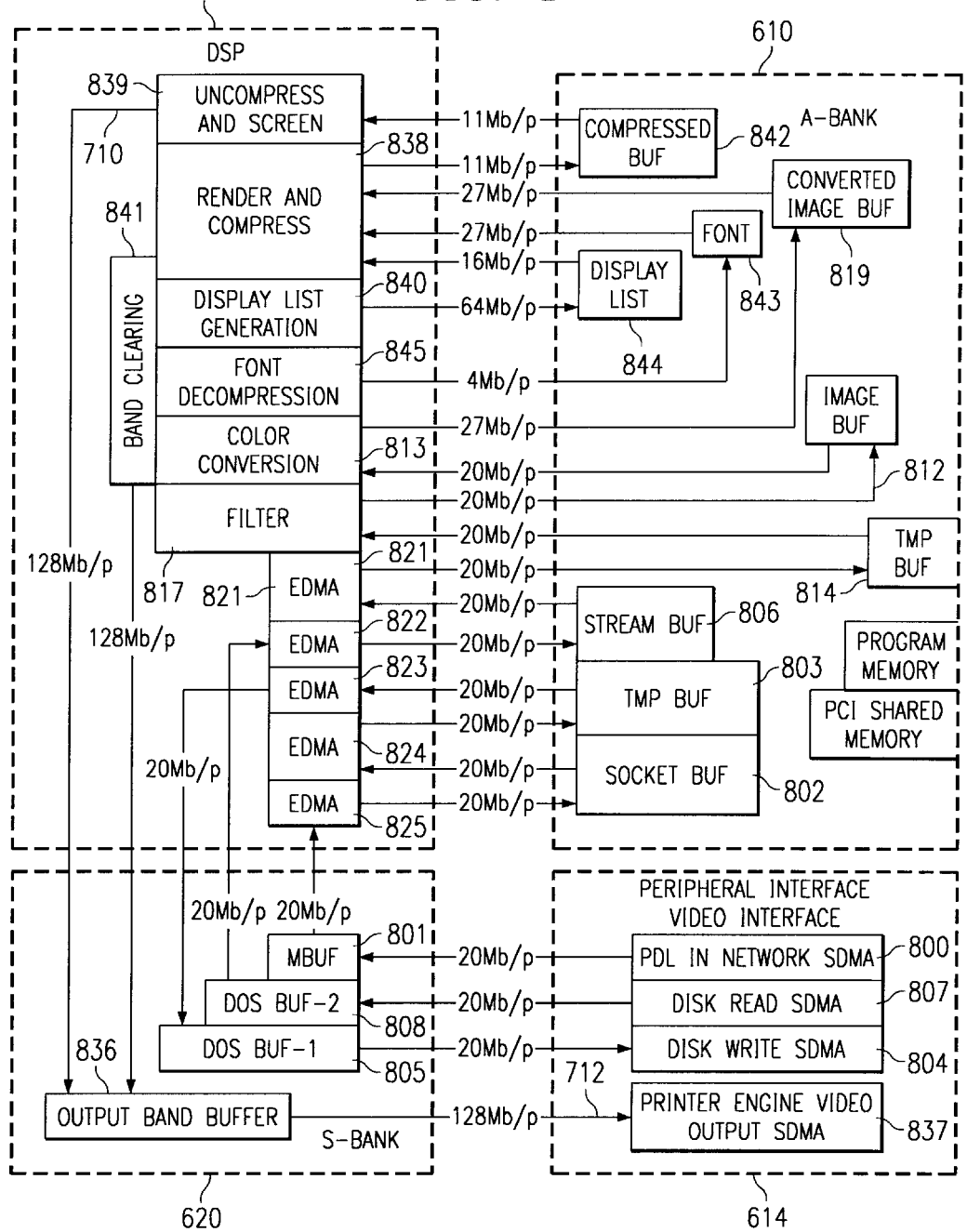
FIG. 8 illustrates the system bandwidth requirements for specific operations between the digital signal processor, the local memory interface, shared memory interface and the peripheral interface.

FIG. 8 illustrates the flow of data between the various system buffers and processing operations from the time it is received as a network packet until the final image is sent out to the print engine. Three parts of the printer controller are identified with dashed-line boxes: A Bank local memory 610, digital signal processor 600, S Bank shared memory 620, and engine and peripheral interfaces 614. Data flow from engine and peripheral interfaces 614 to printer engine 612 via pixel bus 615 is omitted. Operations and operation end points are given in boxes in FIG. 8. Each transfer of data is represented by a line and is labeled with the transfer size (in Mbytes/page). Table 3 gives a complete list showing the bus bandwidth requirements for each controller on each bus and the total bus requirements. Specific operations in FIG. 8 may be cross-referenced to the list given following Table 3, which also shows the bus bandwidth requirements for each major controller operation.

For example, operation 1 takes a 20 Mb PDL file (e.g. from the PCI network card) and places it in mbuffer 801. Digital signal processor 600 then copies the contents of mbuffer 801 into socket buffer 802 in A Bank local memory 610. Table 3 entry 1 shows a system direct memory access SBus operation of 20 Mbytes/page (transfer into mbuffer 801), a 20 Mbytes/page digital signal processor 600 SBus transfer (to EDMA 825 from mbuffer 801), and a digital signal processor 600 ABus transfer of 20 Mbytes/page (from EDMA 825 to socket buffer 802).

TABLE 3

| Number | Operation | DSP ABus | DSP SBus | SDMA ABus | SDMA SBus | ABus Total | SBus Total |
|---|---|---|---|---|---|---|---|
| 1 | Networking | 20 | 20 | 0 | 20 | 40 | 40 |
| 2 | Spooling | 60 | 20 | 0 | 20 | 80 | 40 |

TABLE 3-continued

| Number | Operation | DSP ABus | DSP SBus | SDMA ABus | SDMA SBus | ABus Total | SBus Total |
|---|---|---|---|---|---|---|---|
| 3 | Stream I/F | 20 | 20 | 0 | 20 | 40 | 40 |
| 4 | Image Filter | 80 | 0 | 0 | 0 | 80 | 0 |
| 5 | Color Conversion | 47 | 0 | 0 | 0 | 47 | 0 |
| 6 | Text Interpretation | 4 | 0 | 0 | 0 | 4 | 0 |
| 7 | Graphics Interpretation | 64 | 0 | 0 | 0 | 64 | 0 |
| 8 | Band Clearing | 0 | 128 | 0 | 0 | 128 | 128 |
| 9 | Rendering and Compression | 43 | 0 | 0 | 0 | 43 | 0 |
| 10 | Compressed Output Data | 11 | 0 | 0 | 0 | 11 | 0 |
| 11 | Decompress and Screen | 11 | 128 | 0 | 0 | 139 | 128 |
| 12 | Video Output Data | 0 | 0 | 0 | 128 | 0 | 128 |
| | Total | 560 | 316 | 0 | 188 | 676 | 504 |

The ABus total is the sum of all system direct memory access ABus transfers and all digital signal processor ABus and SBus transfers. Digital signal processor SBus transfers use the ABus as well and must be counted toward the total ABus bandwidth. For the networking operation (operation 1), system direct memory access controller 604 ABus transfer size is 0, the digital signal processor 600 ABus transfer size is 20 Mbytes/page and the digital signal processor 600 SBus transfer size is 20 Mbytes/page. So the ABus total is 40 Mbytes/page.

The SBus total is the sum of all digital signal processor 600 SBus accesses and system direct memory access controller 602 SBus and ABus transfers. System direct memory access controller 604 ABus transfers use the SBus as well and must be counted towards total SBus bandwidth. In the above example (networking operation 1), the digital signal processor 600 SBus transfer size is 20 Mbytes/page, the system direct memory access controller 604 ABus transfer size is 0, and the system direct memory access controller 604 SBus transfer size is 20 Mbytes/page. This results in an SBus bandwidth total of 40 Mbytes/page.

By way of further description of the twelve operations, their make-up from basic transfer operations may be listed as follows with reference numbers from FIG. 8.

1. Networking: ABus 40 Mbytes/page; SBus 40 Mbytes/page
    From PDL In 800 to mbuffer 801 to EDMA 825 to socket buffer 802.
2. Spooling: ABus 80 Mbytes/page; SBus 40 Mbytes/page
    From socket buffer 802 to EDMA 824 to temporary buffer 803 to DMA 823 to DOS buffer-1 825 to disk write buffer 804.
3. Stream I/F: ABus 40 Mbytes/page; SBus 40 Mbytes/page
    From disk read 807 to DOS buffer-2 808 to EDMA 822 to stream buffer 806.
4. Image Filter: ABus 80 Mbytes/page; SBus 0 Mbytes/page
    From stream buffer 806 to EDMA 821 to temporary buffer 814 to filter 817 to image buffer 812.
5. Color Conversion: ABus 47 Mbytes/page; SBus 0 Mbytes/page
    From image buffer 812 to color conversion 813 to converted image buffer 819.
6. Text Interpretation: ABus 4 Mbytes/page; SBus 0 Mbytes/page From font decompression 845 to font buffer 843.

7. Graphics Interpretation: ABus 64 Mbytes/page; SBus 0 Mbytes/page

From display list generation 840 to display list buffer 844.

8. Band Clearing: ABus 128 Mbytes/page; SBus 128 Mbytes/page

From band clearing operation 841 to output band buffer 836.

9. Rendering and Compression: ABus 43 Mbytes/page; SBus 0 Mbytes/page

From render and compress operation 838 to compressed buffer 842.

10. Compressed Output Data: ABus 11 Mbytes/page; SBus 0 Mbytes/page

From compressed buffer 842 to uncompress and screen operation 839.

11. Decompress and Screen: ABus 139 Mbytes/page; SBus 128 Mbytes/page

From uncompress and screen operation 839 to output band buffer 836.

12. Video Output Data: ABus 0 Mbytes/page; SBus 128 Mbytes/page

From output band buffer 836 to printer engine video output 837.

For the system of this invention the total bandwidth requirement of all twelve operations sums up to an ABus total of 676 Mbytes/page and an SBus total is 504 Mbytes/page. At 16 page/min performance, this translates into a total bandwidth requirement of 171 Mbytes/sec for the ABus and 126 Mbytes/s for the SBus. In the conventional printer controller system, by contrast, these same twelve operations required a sum total of 1052 Mbytes/page, which at 16 pages/min results in a total bandwidth requirement of 280 Mbytes/sec on the common processor bus. This illustrates an improvement in the bandwidth requirement for the processor bus, allowing more of the limited memory bandwidth to be allotted to instruction and data accesses for compute operations and increasing overall system performance.

The overwhelming major bandwidth improvement results from key operations such as the video output operation, operation 12; and also from operations 1, networking; and operation 3, stream I/F. In the system of this invention during the very common processor-initiated video output operation of which operation 12 is one portion, the processor bus bandwidth required is reduced to one-half of that required in the conventional system. Table 4 lists the side-by-side comparison of each of the operations of Table 3 with the corresponding operations in Table 1.

TABLE 4

| Number | Operation | Processor Bus: Conventional Printer Controller | ABus: Shared Memory Printer Controller |
|---|---|---|---|
| 1 | Networking | 120 | 40 |
| 2 | Spooling | 80 | 80 |
| 3 | Stream I/F | 80 | 40 |
| 4 | Image Filter | 80 | 80 |
| 5 | Color Conversion | 47 | 47 |
| 6 | Text Interpretation | 4 | 4 |
| 7 | Graphics Interpretation | 64 | 64 |
| 8 | Band Clearing | 128 | 128 |
| 9 | Rendering and Compression | 43 | 43 |

TABLE 4-continued

| Number | Operation | Processor Bus: Conventional Printer Controller | ABus: Shared Memory Printer Controller |
|---|---|---|---|
| 10 | Compressed Output Data | 11 | 11 |
| 11 | Decompress and Screen | 139 | 139 |
| 12 | Video Output Data | 256 | 0 |
|  | Total | 1052 | 676 |

What is claimed is:

1. A printer controller for processing print data comprising:

a data processor;

a first memory;

a first data transfer bus connected to said data processor and said first memory;

a direct memory access controller;

a second memory;

a second data transfer bus connected to said direct memory access controller and said second memory;

a bus switch connected to said first data transfer bus and said second data transfer bus, said bus switch selectively coupling or not coupling said first data transfer bus and said second data transfer bus, whereby when said bus switch uncouples said first data transfer bus and second data transfer bus, said data processor may transfer data with said first memory via said first data transfer bus and said direct memory access controller may independently transfer data with said second memory via said second data transfer bus, and when said bus switch couples said first data transfer bus and second data transfer bus, either said data processor may transfer data with said second memory via said first data transfer bus, said bus switch and said second data transfer bus or said direct memory access controller may transfer data with said first memory via said second data transfer bus, said bus switch and said first data transfer bus; and a peripheral interface connected to said first data transfer bus and said second data transfer bus, and connectable to at least one device external to said printer controller, said peripheral interface capable of transferring data from the at least one device external to said printer controller.

2. The printer controller of claim 1, wherein:

said data processor is a digital signal processor.

3. The printer controller of claim 1, wherein:

said peripheral interface further includes a video output port generating pixel data corresponding to picture elements on a page to be printed;

said printer controller further includes a pixel bus connected to said video output port of said peripheral interface; and said printer controller further includes a printer engine connected to said pixel bus, said printer engine producing a printed page corresponding to data received via said pixel bus.

4. A memory management method used in a printer controller including a data processor and a system direct memory access controller, the method comprising the steps of:

providing a first memory connected to the data processor via a first bus;

providing a second memory connected to the system direct memory access controller via a second bus;

selectively connecting the first bus and the second bus thus permitting either
the data processor to access the second memory, or
the system direct memory access controller to access the first memory;

storing instructions for the data processor and working variable data in the first memory; and selectively configuring space within the first memory and the second memory for input/output buffers and pixel data buffers to balance expected data transfer use of the first bus and the second bus.

5. The memory management method of claim 4, further comprising the step of:

configuring space within the second memory for storing data of PCI channel transfers.

6. The memory management method of claim 4, further comprising the step of:

configuring space within the second memory for storing data of PCI flex-target transfers.

7. The memory management method of claim 4, further comprising the step of:

configuring space with the first memory for storing data of PCI shared memory transfers.

8. The memory management method of claim 4, further comprising the step of:

operating the system direct memory access controller to make the second memory the source or destination of direct memory access data transfers.

* * * * *